Patented Nov. 16, 1937

2,098,960

UNITED STATES PATENT OFFICE 2,098,960

PROCESSES FOR CONVERTING HYDROCARBONS

Frederick E. Frey and Walter F. Huppke, Bartlesville, Okla., assignors to Phillips Petroleum Company, Bartlesville, Okla., a corporation of Delaware

REISSUED
OCT 28 1941

No Drawing. Original application May 2, 1934, Serial No. 723,608. Divided and this application April 15, 1935, Serial No. 16,512

3 Claims. (Cl. 260—170)

This application is a division of co-pending application Serial No. 723,608, filed May 2, 1934.

This invention relates to processes wherein saturated hydrocarbons are converted into olefins by catalytic dehydrogenation at elevated temperatures, the nature of the catalyst and the conditions of the conversion being such as to effect simple dehydrogenation of the saturated into the corresponding unsaturated hydrocarbon with very slight decomposition of the usual kind wherein the carbon chain breaks and smaller molecules are formed.

Catalytic dehydrogenation is widely applied to organic compounds, more particularly to alcohols and hydrocarbons. The dehydrogenation of alcohols is readily effected at low temperatures in the presence of various catalytic metals and metallic oxides. That class of hydrocarbons containing the hexamethylene ring may be dehydrogenated in a characteristic manner into the corresponding aromatic hydrocarbons by a small group of catalysts comprising the most active of the hydrogenation catalysts. Both alcohols and hexamethylene hydrocarbons can be successfully dehydrogenated to yield molecular hydrogen and the corresponding dehydrogenation product at moderate temperatures, which need not exceed 300° C. The paraffin hydrocarbons, on the other hand, cannot be dehydrogenated at such low temperatures because of the unfavorable thermodynamic relationships. Temperatures in the range 450° to 600° C. are required to obtain high extents of conversion and while temperatures somewhat below 400° C. will give a measurable dissociation, a prohibitively low pressure or other artifice must be resorted to if extensive conversion, exceeding ten per cent or so is to be effected. In this higher temperature range ordinary decomposition or cracking will take place in the absence of a catalyst to yield smaller molecules by fracture of the carbon chain, and furthermore a protracted exposure to such temperatures will lead to the formation of tar and carbon which will deposit on any catalytic surfaces present and destroy their effectiveness. For these reasons an effective dehydrogenation catalyst for paraffins specifically must meet certain requirements not called for in the other cases. The activity must be high to allow the dehydrogenation to be accomplished in a time so short that cracking is not marked; the active nature of the surface must not be destroyed by the high temperatures; the composition and mechanical structure of the catalyst should discourage tar and carbon formation. Nickel, platinum, and palladium comprise the effective catalysts for dehydrogenating hexamethylene hydrocarbons but these fail under the conditions required for paraffins. Many other substances have been suggested for the dehydrogenation of paraffins which fail in one or more respects. Many difficultly reducible oxides, such as zinc oxide, magnesia, chromic oxide and others prepared in ordinary ways, show high dehydrogenating activity when applied to alcohols, but exhibit little or no dehydrogenating activity when applied to paraffins. The ultimate mechanism of the reaction is probably quite different from that of the alcohol dehydrogenation. The objectives to be achieved by the use of mixtures as catalysts are far from parallel for the two fields of catalysts and the most effective compositions for the two purposes are widely different.

In U. S. Patent 1,905,383, there has been described the use of chromium oxide in the form of a hard dark colored vitreous gel for the purpose of dehydrogenating paraffins. This catalyst is highly active in the useful temperature range. The activity falls off during use and can be restored by heating to 400–550° C. in an oxygen containing gas which effects oxidation of deposited tar and carbon. At 550° C. to 600° C. however it passes over into the common inert form of chromic oxide; the activity is lost and cannot be restored by the oxygen treatment. At somewhat lower temperatures the transformation requires one or more days but ultimately takes place within the elevated temperature range useful in practice for obtaining high conversions. We have discovered that the addition of certain difficultly reducible oxides having little dehydrogenation activity in themselves will delay or prevent the transformation of chromium oxide into the inactive form at temperatures within the working range. Most effective we have found to be the infusible oxides, alumina, zirconia, thorium oxide, silicon dioxide, boric oxide, magnesium oxide and titanium dioxide incorporated in the chromium oxide in such a way that the gel characteristics are conserved. This may be accomplished by precipitating together from aqueous solution the gelatinous hydrous oxides of chromium and one or more of the elements named. The two or more metallic salts may be dissolved together in water and the hydrous oxides precipitated by an excess of alkali, preferably ammonium, sodium or potassium hydroxide. The addition of a small amount of acetic acid prior to precipitation assists in maintaining the gel structure during the subsequent drying of the precipitate. Titanium dioxide, boric oxide and silicon dioxide are of an acidic nature and are best introduced in the form of their alkali salts in aqeous solution. Such a solution may be introduced into the alkali solution used for the precipitation before the solution of the chromium or other salts is introduced, or alternatively the two salt solutions may be poured at the same time into the alkali solution with vigorous stirring. In some cases, particularly when silica is to be incorporated in a mixture with chromium oxide, the hydrous oxides may best be precipitated separately and the gelatinous precipitates mixed before drying. Five per cent or more of the difficultly reducible oxide incorporated in chromium oxide is usually required to effect stabilization to heat. Higher proportions impart greater stability but a proportion so great as to reduce the chromium oxide content to below five per cent is usually undesirable since the activity is unduly decreased. The gelatinous precipitate obtained by this procedure is washed with water, dried slowly in air, granulated, and finally heated to reaction temperature. Prepared in this way, the catalyst is obtained in hard glass granules. It is preferable to perform the heating prior to use in a stream of hydrogen whereupon some reduction of the chromium oxides is effected with formation of water.

The catalyst prepared in this way may be supported in a suitable container and the paraffin to be dehydrogenated passed over the catalyst while a suitable reaction temperature of preferably 450–550° C. is maintained.

The chromium oxide gel thus stabilized by the addition of a difficultly reducible oxide will lose activity during use, but the activity can be restored repeatedly by passing over the catalyst for a short time an oxygen containing gas while maintaining a temperature of 400–550° C. During the decay in activity, tar and carbon form in the catalyst granules and it is probably to this that the loss in activity must be attributed. We have found that the addition of small amounts of certain heavy metal oxides incorporated in the catalyst will bring about a decrease in the rate at which activity is lost and the rate at which carbon forms. Thallium and bismuth oxides are most effective, lead and mercury oxides less so. Since these oxides are readily reduced, they are no doubt finely distributed, for the most part, in the metallic form in the catalyst during use. The heavy metal oxides are incorporated in the catalyst most conveniently by adding a soluble salt of the metal, preferably the nitrate to the chromium salt prior to dissolving and precipitating the hydrous oxides as described. Large proportions of the heavy metal oxides cannot be introduced without loss of the coherent gel structure. Usually less than 20 mol. per cent should be incorporated in the catalyst and an addition of 0.5 to 5 per cent will produce a great lessening in decay of activity during continued dehydrogenation.

The improved catalysts are effective for converting not only paraffins but also alicyclic or aromatic hydrocarbons containing alkyl substituent groups of two or more carbon atoms into the corresponding unsaturated hydrocarbons of the same number of carbon atoms per molecule but of lower hydrogen content. Olefins containing at least four carbon atoms per molecule can similarly be converted into diolefins. Temperatures in the range 300 to 600° C. give best results. The reaction rate with the catalysts described in high and equilibrium extent of dissociation is readily attained. We have found that the lower temperature at which equilibrium dissociation is small may be used at the lower pressures which favor dissociations, or when treating the higher molecular weight hydrocarbons, for which the thermodynamic equilibrium dissociation is large at the lower temperatures. The dissociation is repressed by high pressures, and pressures exceeding a few atmospheres are accordingly undesirable. Pressures in the neighborhood of atmospheric give good results, and pressures below atmospheric permit still greater dissociation.

Where the catalysts are used to effect hydrogenation of olefins or diolefins, temperatures of 200 to 500° C. may be used, preferably the lower temperatures and a high partial pressure of hydrogen and pressures above atmospheric are desirable but not necessary. These catalysts exhibit good activity at low hydrogen pressures and resist poisoning by sulfur compounds.

*Example 1.*—An aqueous solution of chromic nitrate and aluminum nitrate containing the salts in the molar ratios of one to one was introduced into an excess of dilute aqua ammonia. The gelatinous precipitate of the mixed hydrous oxides was then washed with water thoroughly, filtered off, dried slowly in air to a glassy gel and granulated. A 5 cc. portion of the granular gel was supported in a catalyst tube and a stream of n-butane passed over it at rate of ten liters per hour while the temperature was maintained at 450° C. A 12 per cent conversion into butenes plus hydrogen was obtained. The activity decayed during use; the conversion fell to 6 per cent during 14 hours. The flow of butane was interrupted, the catalyst treated with oxygen at 450° C. and the catalyst was found to have been restored to original activity. The catalyst was used and restored to original activity in this way many times. A chromium oxide gel containing no added metals or other oxides which was used and reactivated in the same way suffered a serious loss in activity after two reactivations by oxygen.

*Example 2.*—A chromium oxide-aluminum oxide gel was prepared as in Example 1 except that 2 mol. per cent of thallium nitrate was incorporated in the solution of the other metallic salts. The conversion of butane, carried out in the same way, proceeded for 72 hours before extent of conversion fell to 6 per cent and the catalyst was successfully reactivated many times by oxygen.

Having described our invention, what we claim is:

1. In a process for hydrogenating unsaturated hydrocarbons, the steps which comprise passing the said unsaturated hydrocarbons together with hydrogen at temperatures above 200° C. in contact with a vitreous gel catalyst comprising chromium oxide and a difficultly reducible oxide of the group aluminum, zirconium, titanium, silicon, thorium, boron, and magnesium, the said oxides having been combined in a state of intimate association effected while the oxides are in a highly hydrous condition.

2. In a process for hydrogenating unsaturated hydrocarbons, the steps which comprise passing the said unsaturated hydrocarbons together with hydrogen at temperatures above 200° C. in contact with a vitreous gel catalyst comprising chromium oxide and a difficultly reducible oxide of the group aluminum, zirconium, titanium, silicon, thorium, boron, and magnesium, the said oxides having been combined in a state of intimate association effected while the oxides are in a highly hydrous condition, and also at least .5 mol. percent of a readily reducible oxide of the group, thallium oxide, mercury oxide, bismuth oxide and lead oxide.

3. In a process for hydrogenating unsaturated hydrocarbons, the steps which comprise passing the said unsaturated hydrocarbons together with hydrogen at temperatures above 200° C. in contact with a vitreous gel catalyst comprising chromium oxide and a difficultly reducible oxide of the group aluminum, zirconium, titanium, silicon, thorium, boron, and magnesium, the said oxides having been combined in a state of intimate association effected while the oxides are in a highly hydrous condition, continuing said passage until the activity of said catalyst becomes reduced, and then restoring the activity of said catalyst by subjecting it to treatment with an oxygen containing gas at an elevated temperature.

FREDERICK E. FREY.
WALTER F. HUPPKE.